United States Patent

Seitz et al.

[11] Patent Number: 5,850,824
[45] Date of Patent: Dec. 22, 1998

[54] METHOD OF DETERMINING THE COMPOSITION OF FUEL IN A FLEXIBLE FUELED VEHICLE WITH AN O2 SENSOR

[75] Inventors: Gary L. Seitz, Chelsea; Yi Cheng, Jackson; Mark E. Hope, Ann Arbor; Shean Huff, Ann Arbor; Mary Joyce, Farmington Hills; Jerry Kennie, Canton; Dennis A. Krozek, Novi; Robert J. Nankee, II, Canton, all of Mich.

[73] Assignee: Chrysler Corporation, Auburn Hills, Mich.

[21] Appl. No.: 959,797

[22] Filed: Oct. 29, 1997

[51] Int. Cl.[6] .................................................. F02D 41/06
[52] U.S. Cl. ............................................. 123/688; 123/1 A
[58] Field of Search ................................... 123/688, 1 A, 123/494

[56] References Cited

U.S. PATENT DOCUMENTS

| | | |
|---|---|---|
| 4,945,880 | 8/1990 | Gonze et al. ........................... 123/494 |
| 4,945,882 | 8/1990 | Brown et al. ........................... 123/1 A |
| 5,150,301 | 9/1992 | Kashiwabara et al. ................. 123/494 |
| 5,197,450 | 3/1993 | Kitajima et al. ........................ 123/1 A |
| 5,255,661 | 10/1993 | Nankee, II et al. .. |
| 5,335,637 | 8/1994 | Davis et al. .. |
| 5,365,917 | 11/1994 | Adams et al. .. |
| 5,400,762 | 3/1995 | Fodale et al. .. |
| 5,415,145 | 5/1995 | Letcher et al. .. |
| 5,435,285 | 7/1995 | Adams et al. .. |
| 5,467,755 | 11/1995 | Konrad et al. .. |
| 5,497,753 | 3/1996 | Kopera . |
| 5,520,162 | 5/1996 | Rotramel et al. .. |

*Primary Examiner*—Erick R. Solis
*Attorney, Agent, or Firm*—Mark P. Calcaterra

[57] ABSTRACT

The present invention provides a method for controlling the combustion parameters of an internal combustion engine with an oxygen sensor prior to a closed loop operating condition. If the output voltage of the oxygen sensor indicates a lean air to fuel ratio condition, the percent alcohol content is incremented to a limit based on an E85 possibility curve. If the voltage output of the oxygen sensor indicates a rich air to fuel ratio condition, the percent alcohol content is decremented to a limit based on an E0 possibility curve. After the end of the fuel blending period or when the internal combustion engine reaches a closed loop mode, control of the combustion parameters of the internal combustion engine are returned to normal regime oxygen sensor feedback control.

12 Claims, 1 Drawing Sheet

METHOD OF DETERMINING THE COMPOSITION OF FUEL IN A FLEXIBLE FUELED VEHICLE WITH AN O2 SENSOR

BACKGROUND OF THE INVENTION

1. Technical Field

The present invention relates generally to fuel control systems and, more particularly, to a method of controlling combustion parameters of an internal combustion engine in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

U.S. Pat. No. 5,255,661, entitled "Method for Determining Fuel Composition Using Oxygen Sensor Feedback Control", hereby expressly incorporated by reference, discloses a method for determining the percent alcohol content of the fuel in the fuel tank utilizing the oxygen sensor feedback control loop to sense changes in air/fuel ratio and relay that information to the engine controller so that dependant variables can be adjusted accordingly.

In closed loop operating conditions, oxygen sensor switching voltages may be targeted as a means to control engine fueling needs based upon the percent alcohol content of the fuel being introduced. For the purposes of this specification, closed loop operating conditions refers to that state of engine operation in which feedback and fuel content changes are based on a functioning, accurate oxygen sensor. However, during open loop fuel blending conditions, poor drivability can exist until closed loop controls take effect. Open loop conditions refers to that state of engine operation in which feedback and fuel content changes are not based on a functioning, accurate oxygen sensor. In cold ambient temperatures, the ability of a system to reach closed loop conditions may exceed four minutes. Therefore, it would be desirable to provide a system for controlling engine operating parameters during open loop fuel blending conditions based on the fuel content that is being introduced in the induction system during this period.

SUMMARY OF THE INVENTION

It is, therefore, one object of the present invention to provide a system of flexible fuel compensation.

It is another object of the present invention to provide a flexible fuel compensation system which provides predictable open loop fueling adjustments with minimal corruption.

It is yet another object of the present invention to provide a flexible fuel compensation system which identifies trends for predicting final fuel content during blend changes before closed loop controls take effect.

It is still another object of the present invention to provide a flexible fuel compensation system that maintains target level drivability during open loop operation.

The above and other objects are provided by a method of controlling combustion parameters of an internal combustion engine with an oxygen sensor feedback system prior to reaching a closed loop operating condition. The methodology detects a blend change occurring during open loop operation and predicts the type of fuel introduced into the engine during the open loop operation. The methodology also predicts the final fuel percent alcohol content before full blending has occurred to prevent drivability deterioration during extreme blend changes while in the open loop mode. After a preselected period of time, the voltage output of the oxygen sensor is analyzed and a lean or rich ratio of the oxygen sensor voltage is interpreted as indicating a change in the percent alcohol content of the fuel. Accordingly, an update in fueling requirements is made.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
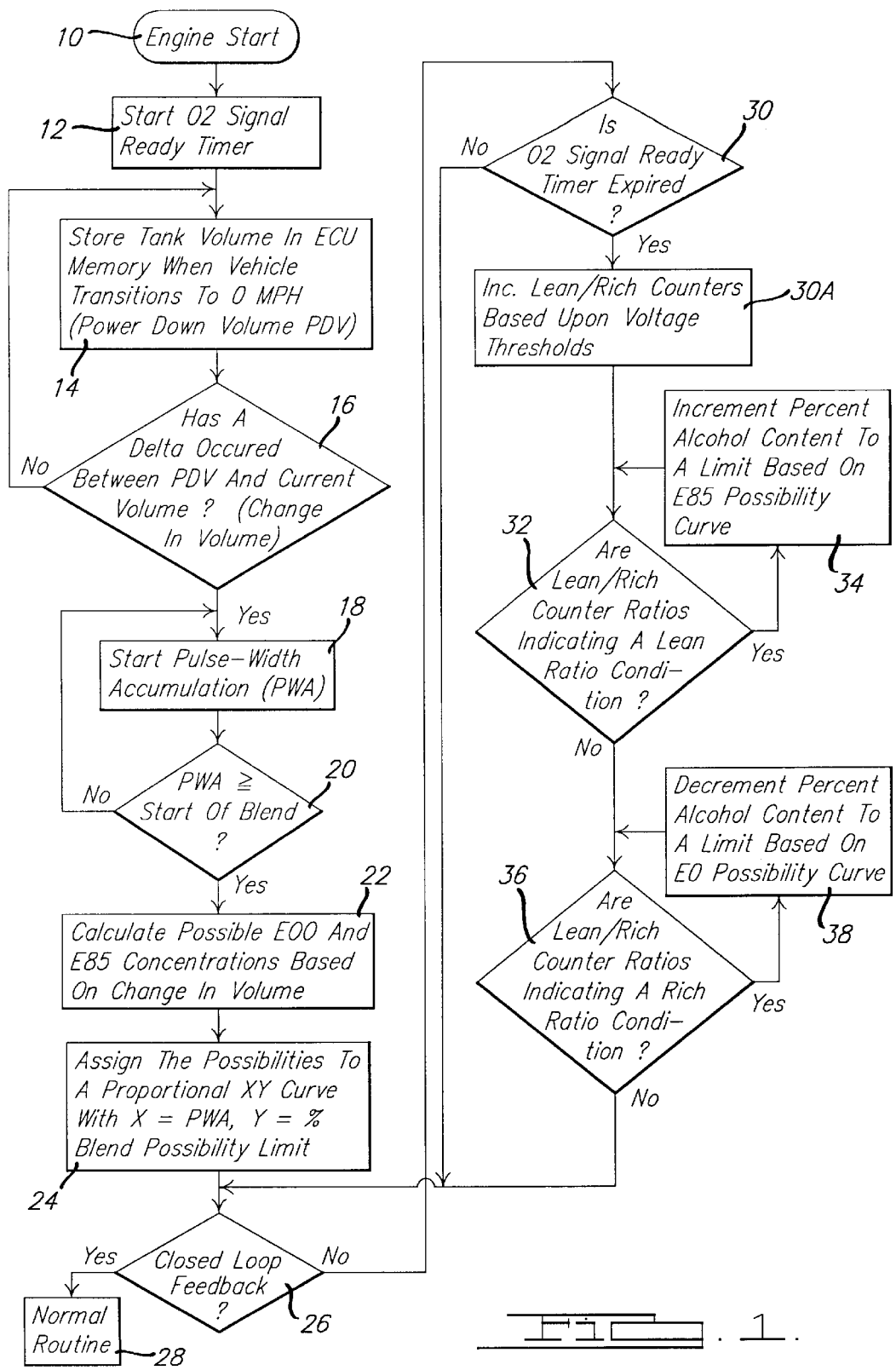
FIG. 1 is a flow chart of a method for controlling combustion parameters of an internal combustion engine with an oxygen sensor feedback system during open loop operation.

The present invention is directed towards a method for controlling combustion parameters of an internal combustion engine with an oxygen sensor feedback system prior to reaching closed loop operating conditions. The methodology accounts for oxygen sensor voltage trends after a tank fuel fill but before the oxygen sensor is ready for closed loop operation. By accounting for the oxygen sensor voltage trends, engine fueling requirements may be adjusted during open loop operations as a blend change is occurring in the induction system.

According to the present invention, the methodology initially determines whether a start of blending in the fuel system is occurring. The methodology also determines possible blend ratios of ethanol and gasoline based on fuel fill volume and original fuel percent alcohol content. Thereafter, the oxygen sensor is used to predict a trend in the new fuel's percent alcohol content, based upon its voltage output, well before it is used for typical closed loop control.

The oxygen sensor has an inaccuracy time period during which it is not reliable enough to be used even for trend prediction. Therefore, a timer is decremented for a preselected duration until a prediction/accuracy level of the oxygen sensor is reliable. Once the timer has expired, the oxygen sensor's output voltages are analyzed. A lean or rich oxygen sensor voltage indicates a change in percent alcohol content of the fuel. Accordingly, an update in fueling requirements is made.

If the oxygen sensor voltage is lean of a pre-selected voltage deadband, an oxygen lean counter is incremented. On the other hand, if the oxygen sensor voltage is rich of a pre-selected voltage deadband, an oxygen rich counter is incremented. Depending upon the ratio of the lean and rich counters, a prediction is made as to the fuel content being introduced. Once this prediction has been established, a look-up table is used to determine the maximum and minimum fueling requirements that may be required.

Turning now to the drawing figure, a flow chart for a method of flexible fuel compensation control is illustrated in FIG. 1 for a flexible fuel compensation system of a flexible fueled vehicle. The methodology starts at block 10 with engine start-up and falls through to block 12 and starts an oxygen signal ready timer. From block 12, the methodology advances to block 14. In block 14 the methodology stores the volume of fuel in the tank to the engine control unit (ECU) memory each time the vehicle speed transitions to 0 mph. From block 14, the methodology advances to decision block 16. In decision block 16, the methodology determines if a change in the fuel volume in the tank has occurred since the last volume was stored to the ECU memory. If not, the methodology is returned to block 14.

If the methodology determines that a change in fuel volume has occurred at decision block 16, the methodology advances to block 18. In block 18, the methodology starts an additive counter which accumulates all cylinder delivered fuel injector pulse widths. From block 18, the methodology advances to decision block 20 and determines if the accumulated pulse widths are greater than or equal to a preselected value indicative of a start of the fuel blending period. If not, the methodology returns to block 18 and continues to accumulate consecutive pulse widths.

Once the pulse width accumulation in decision block 20 is greater than or equal to the threshold value, the methodology advances to block 22. In block 22, the methodology calculates possible E0 (0% ethanol and 100% gasoline) and E85 (85% ethanol and 15% gasoline) fuel concentrations based on the change in the fuel volume in the fuel tank and the percent alcohol content of the old fuel. That is:

E0 possibility=(old concentration)*(old volume)/(new volume); and

E85 possibility=[(old concentration)*(old volume)+(85% ethanol)*(added volume)]/(new volume).

From block 22 the methodology advances to block 24.

In block 24, the methodology assigns the E0 and E85 possibilities to a proportional curve. The curve is based on the pulse width accumulation value and the percent alcohol content blend possibility limit. That is, once a calibrated number of pulse width accumulated steps (block 18) have been accumulated, the ratio of lean counts to rich counts (see block 30A) is determined. Based upon this ratio, a determination can be made as to the direction and point on the possibility curve the inferred fuel value should start. From block 24, the methodology advances to decision block 26.

In decision block 26, the methodology determines if engine operations have reached a closed loop mode. If so, the methodology advances to block 28 where the oxygen sensor feedback system is employed in its normal operating regime to establish operating parameters for the internal combustion engine. A detailed explanation of this operating regime can be found in U.S. Ser. No. 08/958,411, entitled "Method of Determining a Composition of Fuel in a Flexible Fueled Vehicle" to Nankee II et al. which is hereby expressly incorporated by reference herein. At this point, the methodology exits the routine and returns to block 14 to wait for the vehicle to transition to a stop and take on additional fuel.

If the engine operating conditions are not in a closed loop mode at decision block 26, the methodology advances to decision block 30. In decision block 30, the methodology determines if the oxygen sensor voltage is reliable enough for reading. This is indicated by the counter in block 12 reaching a predetermined value. If the oxygen sensor voltage is not reliable for reading, the methodology returns to decision block 26 to wait for the required level of reliability. However, if the oxygen sensor voltage is ready for reading at decision block 30, the methodology advances to block 30A. In block 30A, the methodology increments either a lean or rich counter. That is, during each cylinder event, the oxygen sensor voltages are compared to an upper and lower calibrated threshold. If the voltage is at or below the lower threshold, a lean counter is incremented. If the voltage is at or above the upper threshold, a rich counter is incremented.

In decision block 32, the methodology determines if the lean/rich counter ratio, based on oxygen sensor voltage, is above a threshold indicating a lean operating condition. If so, the methodology advances to block 34 and increments the percent alcohol content value up to a limit based on the proportional xy curve determined in block 24 based on the E85 possibility curve described above. From block 34, the methodology returns to decision block 32 to recheck the ratio to determine if it is still indicating a lean condition.

When the lean/rich counter ratio, based on oxygen sensor voltage, is not above the threshold indicating a lean operating condition at decision block 32, the methodology advances to decision block 36. In decision block 36, the methodology determines if the lean/rich counter ratio, based on oxygen sensor voltage, is below a second threshold indicating a rich operating condition. If so, the methodology advances to block 38 and decrements the percent alcohol content value to a limit based on the proportional xy curve determined in block 24 based on the E0 possibility curve described above. From block 38, the methodology returns to decision block 36 and rechecks the ratio to determine if a rich ratio condition still exists.

When the lean/rich counter ratio, based on oxygen sensor voltage, is not below the second threshold indicating a rich operating condition at decision block 36, the methodology returns to decision block 26 and continues the loop.

According to the above, the present invention provides a system for controlling the combustion parameters of an internal combustion engine capable of operating on more than one type of fuel during open loop operating conditions. The system uses the output of the oxygen sensor during a fuel blending period to predict the percent alcohol content of the still blending fuel and sets the combustion parameters accordingly. Once the blend period is complete, the system returns control of the combustion parameters to the normal regime of an oxygen sensor feedback system normal regime.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method for controlling combustion parameters of an internal combustion engine in a flexible fueled vehicle with an oxygen sensor prior to a closed loop operating condition comprising:

determining if newly added fuel has started to blend with old fuel in a fuel system of said vehicle;

determining possible blend ratios of ethanol and gasoline based on a volume of said newly added fuel and a percent alcohol content of said old fuel;

determining if a lean operating condition exists;

determining if a rich operating condition exists;

incrementing a percent alcohol content value based on a first of said possible blend ratios if said lean ratio condition exists;

decrementing said percent alcohol content based on a second of said possible blend ratios if said rich ratio condition exists; and setting said combustion parameters according to said percent alcohol content.

2. The method of claim 1 wherein said step of determining if said newly added fuel has started to blend with said old fuel in said fuel system further comprises comparing a pulse width accumulation value to a preselected value.

3. The method of claim 1 wherein said step of determining if a lean operating condition exists further comprises comparing a ratio of a lean counter and a rich counter to a known threshold.

4. The method of claim 1 wherein said step of determining if a rich operating condition exists further comprises comparing a ratio of a lean counter and a rich counter to a known threshold.

5. The method of claim 1 wherein said first of said possible blend ratios further comprises an E85 possibility curve.

6. The method of claim 5 wherein said E85 possibility curve corresponds to a pulse width accumulation and a percent blend possibility limit.

7. The method of claim 1 wherein said second possible blend ratio further comprises an E0 possibility curve.

8. The method of claim 7 wherein said E0 possibility curve corresponds to a pulse width accumulation and a percent blend possibility limit.

9. The method of claim 1 further comprising delaying said step of determining said lean air to fuel ratio condition and said step of determining said rich air to fuel ratio condition until after a preselected time period has elapsed.

10. The method of claim 9 wherein said preselected time period corresponds to said oxygen sensor being reliable for reading.

11. The method of claim 1 further comprising determining if a change in a volume of fuel in said tank has occurred.

12. The method of claim 1 further comprising implementing normal regime oxygen sensor feedback system control of said combustion parameters when said internal combustion engine reaches a closed loop operating condition.

* * * * *